S. W. CRAMER.
AIR CONDITIONING APPARATUS.
APPLICATION FILED AUG. 11, 1913.
1,147,484.
Patented July 20, 1915.
2 SHEETS—SHEET 2.
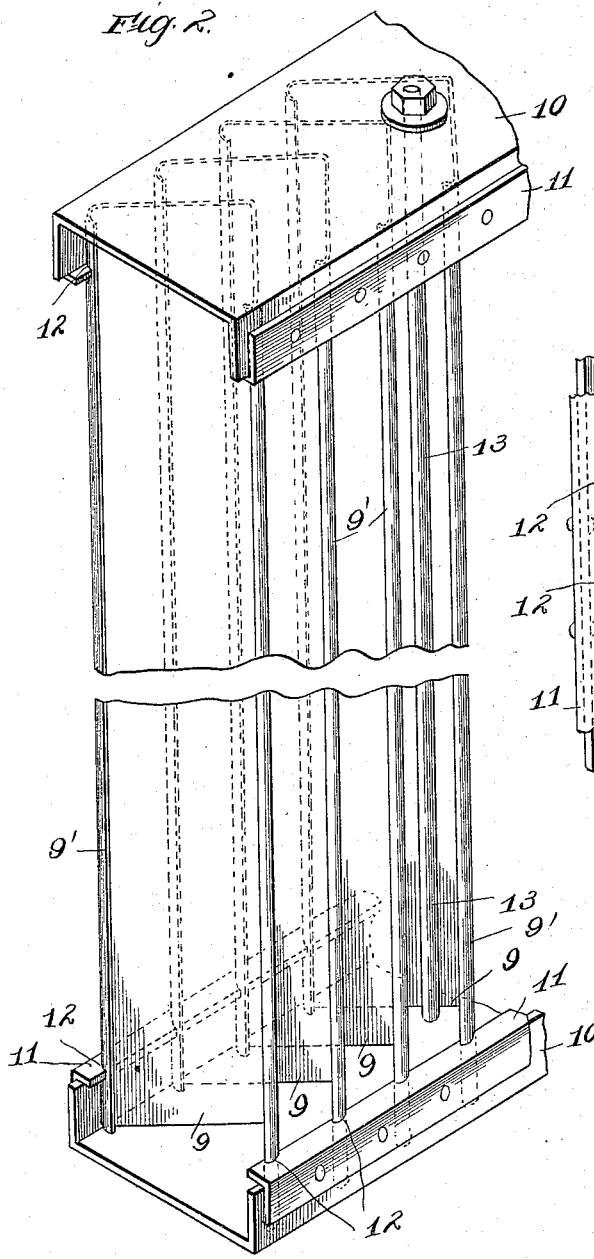
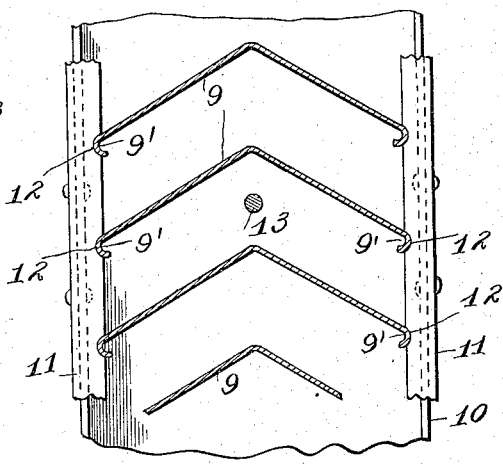

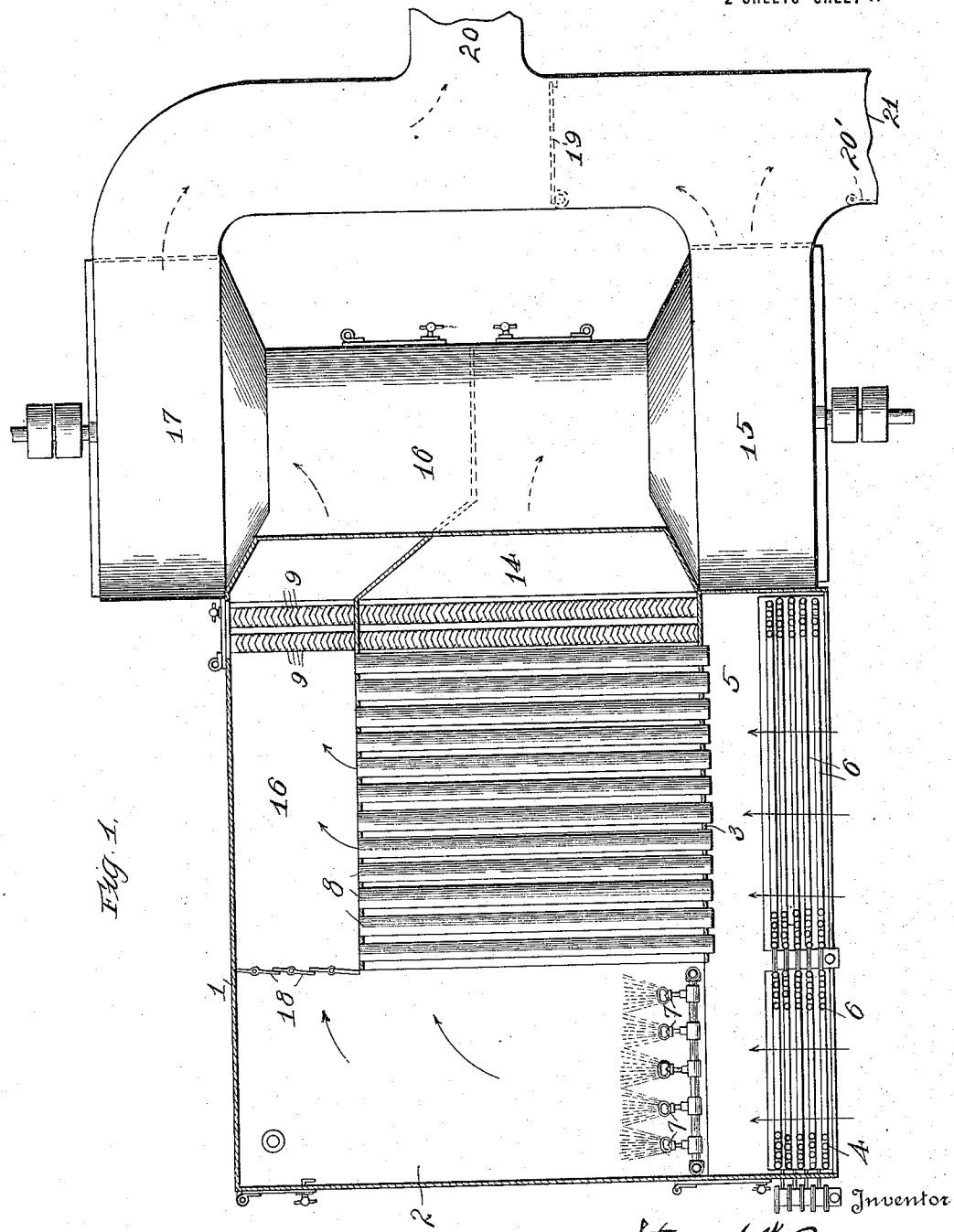

UNITED STATES PATENT OFFICE.

STUART W. CRAMER, OF CHARLOTTE, NORTH CAROLINA.

AIR-CONDITIONING APPARATUS.

1,147,484.   Specification of Letters Patent.   Patented July 20, 1915.

Original application filed April 15, 1909, Serial No. 490,079. Divided and this application filed August 11, 1913. Serial No. 784,280.

*To all whom it may concern:*

Be it known that I, STUART W. CRAMER, a citizen of the United States, residing at Charlotte, in the county of Mecklenburg and State of North Carolina, have invented certain new and useful Improvements in Air-Conditioning Apparatus; and I do hereby declare the following to be a full, clear, and exact description of the invention, such as will enable others skilled in the art to which it appertains to make and use the same.

This application is a division of application Serial Number 490,079, filed April 15, 1909.

The invention relates to apparatus for treating air, whereby the air is cleansed of its impurities, and is conditioned by the addition or subtraction of moisture and heat, as may be desired.

The object of the invention is to provide an apparatus along new and novel lines, whereby air cleansing, moistening, heating and cooling are attained as heretofore in similar types of apparatus, with the further advantage that cooling may also be continued even though moistening be discontinued, and without the air of refrigeration, the circulation of cold water, or other liquids, and the like. It is well known that in this or any other type of humidifier, air can be cooled in direct proportion to the amount of moisture evaporated, the limit of which is, of course, saturation. Advantage is taken of this fact, to cool the air required for ventilation by saturating it before introduction into a building, so that in summer time it may be cooled to the wet bulb temperature of the air passing through the apparatus. That this exerts a very decided and beneficial cooling effect, is not to be denied, a great deal of the time, its only drawback lies in the fact that a great many times by continuing to saturate the air and introduce it into the building, the already disagreeable humidity may be materially increased. At such times the moisture must be cut off, and then no cooling effect is obtained except so far as is the difference between the air passing through the apparatus and that in the room to be cooled. The air entering the apparatus is sometimes entirely outside air, at other times it is all inside air, and at other times still it is a mixture of the two, the inside and the outside air.

The invention will be fully disclosed in the following specification and claim.

In the accompanying drawings, which form part of this specification: Figure 1 represents a plan view partly in horizontal section, of apparatus embodying my invention. Fig. 2 represents a detail perspective, on an enlarged scale of the preferred form of baffle or eliminator plates for condensing the free moisture from the air, and Fig. 3 represents a sectional plan view of the baffle plates on an enlarged scale.

Reference being had to the drawings and the designating characters thereon, the numeral 1 indicates an outer casing or shell, which may be built of sheet metal, brick or other preferred material and constitutes an air chamber, 2 a spray or air moistening chamber and 3 a cooling chamber within the air chamber.

4 is the air inlet to the spray chamber, 5 the air inlet to the cooling chamber, and 6 are heating coils for tempering the incoming air to each chamber as may be desired.

7 are spray heads within the spray chamber, and 8 are tubes arranged within the cooling chamber and through which passes the incoming air to be cooled. Within the cooling chamber 3 the tubes 8 are arranged so that the air entering the spray chamber passes through the cooling chamber, around, over and above the tubes 8 and thence out to the fan inlet or otherwise.

9 are baffle plates, eliminators or condensing surfaces for collecting the surplus moisture from the surcharged air passing through the apparatus. The baffle plates 9 are of sheet metal approximately V-shaped, but provided with inwardly curved edges 9' to prevent the condensed water being blown off the edges of the plates and carried on into the fan proper, these being suitably fastened at their ends in angular members 10, and properly spaced by side plates 11 provided with notches 12 which engage the edges of the plates, as shown in Fig. 2, and the members 10 are secured together by the tie rods 13, only one of which is shown. The bank of baffle plates or eliminators is properly secured within the casing in any preferred manner.

Each plate 9 is spaced with reference to the next succeeding plate so that the center of the plate constituting the apex of the bend is slightly inside the straight line joining the inwardly curved edges 9' of the next succeeding plate. The plates are disposed in this manner for the purpose of changing the direction of the entire volume of air that passes between them, and it is readily seen that the particles of free moisture, or even good sized drops of water, being carried along with this air current will not be diverted as readily as the air, and their momentum will carry them against the sides of the eliminator plates, where, of course, they will condense and be caught by the inwardly curved edges 9' and carried off at the bottom. One of the essential advantages of this type of construction is the fact that these eliminator plates being made up in banks, as it were, more or less sets of banks can be used, as the occasion requires. In case, for instance, it is not absolutely necessary to remove all the free moisture from the air, and it is undesirable to reduce the velocity of the air to any degree, only one bank would be employed. On the other hand, if it is required to have all of the free moisture removed, another similar bank, or even two similar banks of eliminator plates can be used, one directly back of the other, so whenever the free moisture passes through the first bank it will be suitably caught on either the second or the third bank of plates.

14 is the outlet for the spray charged air after it has passed through the cooling chamber, thence into the fan 15, which may be of any preferred type.

16 is a chamber to receive the cooled air which has passed through the tubes 8 in the cooling chamber, from whence it passes through the fan 17.

18 are dampers separating the spray chamber 2 from the outlet 16.

19 is a damper separating the outlets from the two fans 15 and 17, and 20' is a damper controlling the supplemental outlet 21 to the fan 15.

From the foregoing it will be seen, that one current of air enters the spray chamber 2 through the inlet 4, then passes around and above the tubes 8 in the cooling chamber 3 on its way out of the apparatus through the opening 14 leading to the fan 15; from whence it travels in the direction indicated by the arrows, either mixing with the air from the other fan 17 and entering the building through outlet 20, or from whence by closing the damper 19 and opening the damper 20' the air from the fan 15 can be directed out through its auxiliary outlet 21 to the outer atmosphere. The air entering the inlet 5 to the cooling chamber 3 passes through the tubes 8 which are kept cooled by the spray and air from the spray chamber, thence through the chamber 16 into the fan 17 and out as indicated by the arrows through the main outlet 20 into the building. So that, with this apparatus there are two separate and distinct currents, one of them cooled to the temperature of saturation, which is the wet bulb temperature of the air passing through the spray and to which moisture has been added, and the other, air cooled to nearly the same temperature, but to which no moisture has been added.

Having thus fully described my invention, what I claim is:

In an air conditioning apparatus, a series of banks of baffle plates, each bank comprising a series of approximately parallel and uniformly spaced V-shaped plates with inwardly curved edges, oppositely disposed substantially U-shaped end members, substantially L-shaped angle members secured, one, to each of the oppositely disposed flanges of said U-shaped members and having one of their edges provided with a series of spaced curved recesses adapted to retain the inwardly curved edges of said V-shaped plates, and means for securing said end members together whereby to clamp said baffle plates therebetween.

In testimony whereof I affix my signature in presence of two witnesses.

STUART W. CRAMER.

Witnesses:
 JNO. C. WATSON,
 WM. B. HODGE.